United States Patent
Maeno et al.

(10) Patent No.: US 11,295,892 B2
(45) Date of Patent: Apr. 5, 2022

(54) CORE AND COIL MOLDING STRUCTURE AND MANUFACTURING METHOD THEREOF

(71) Applicant: Tamura Corporation, Tokyo (JP)

(72) Inventors: Kensuke Maeno, Sakado (JP); Masashi Yamada, Sakado (JP)

(73) Assignee: TAMURA CORPORATION, Tokyo (JP)

( * ) Notice: Subject to any disclaimer, the term of this patent is extended or adjusted under 35 U.S.C. 154(b) by 495 days.

(21) Appl. No.: 15/683,807

(22) Filed: Aug. 23, 2017

(65) Prior Publication Data

US 2018/0061567 A1    Mar. 1, 2018

(30) Foreign Application Priority Data

Aug. 24, 2016   (JP) .............................. JP2016-163784

(51) Int. Cl.
*H01F 41/02*    (2006.01)
*H01F 41/00*    (2006.01)
(Continued)

(52) U.S. Cl.
CPC ... *H01F 41/0246* (2013.01); *B29C 45/14065* (2013.01); *B29C 45/14467* (2013.01);
(Continued)

(58) Field of Classification Search
CPC ........ B29C 45/14065; B29C 45/14467; B29C 45/14639; H01F 27/255; H01F 27/327; H01F 27/022; H01F 41/005; H01F 41/0246; H01F 41/127; H01F 27/32; H01F 27/24; H02K 15/12; H02K 5/24
See application file for complete search history.

(56) References Cited

U.S. PATENT DOCUMENTS 3,944,182 A * 3/1976 Yanagita ........... B29C 45/14639
                                                      249/83
5,589,808 A * 12/1996 Clark ..................... B29C 45/34
                                                      336/92
(Continued)

FOREIGN PATENT DOCUMENTS

JP     H06295826 A    10/1994
JP     H11288824 A    10/1999
(Continued)

OTHER PUBLICATIONS

Office Action dated Jan. 7, 2020 for corresponding JP patent application No. 2016-163784, with English translation.

*Primary Examiner* — Seyed Masoud Malekzadeh

(74) *Attorney, Agent, or Firm* — Nath, Goldberg & Meyer; Jerald L. Meyer

(57)    ABSTRACT

Provided are a core and coil molding structure and a manufacturing method thereof which are capable of eliminating a void between coil layers to prevent foreign materials from entering therein, and which improve the vibration resistance and shock resistance of a reactor. A core and coil molding structure includes a coil that is a rectangular coil, a core yoke member in a block shape, and a resin member molding at least a part of those. The presence of a positioning member in a pin shape which positions the coil within a mold forms a groove in the inner circumference of the coil in the resin member.

4 Claims, 14 Drawing Sheets

(51) Int. Cl.
*B29C 45/14* (2006.01)
*H01F 27/02* (2006.01)
*H02K 15/12* (2006.01)
*H01F 27/255* (2006.01)
*H01F 41/12* (2006.01)
*H01F 27/32* (2006.01)
*H02K 5/24* (2006.01)

(52) U.S. Cl.
CPC ..... *B29C 45/14639* (2013.01); *H01F 27/022* (2013.01); *H01F 27/255* (2013.01); *H01F 27/327* (2013.01); *H01F 41/005* (2013.01); *H01F 41/127* (2013.01); *H02K 5/24* (2013.01); *H02K 15/12* (2013.01)

(56) References Cited

U.S. PATENT DOCUMENTS

| | | | | |
|---|---|---|---|---|
| 8,279,035 | B2* | 10/2012 | Yoshikawa | H01F 27/292 336/96 |
| 8,598,973 | B2* | 12/2013 | Kawaguchi | H01F 27/327 336/199 |
| 9,824,806 | B2* | 11/2017 | Nonaka | H01F 27/022 |
| 2011/0234359 | A1* | 9/2011 | Ono | H01F 27/306 336/216 |
| 2012/0098631 | A1* | 4/2012 | Ono | H01F 3/14 336/96 |
| 2012/0119869 | A1* | 5/2012 | Yamamoto | H01F 3/08 336/212 |
| 2013/0181801 | A1* | 7/2013 | Yoshikawa | H01F 37/00 336/180 |
| 2013/0249666 | A1* | 9/2013 | Suzuki | H01F 27/263 336/210 |
| 2014/0159844 | A1* | 6/2014 | Suzuki | H01F 27/24 336/65 |
| 2014/0218158 | A1* | 8/2014 | Miyamoto | H01F 37/00 336/198 |
| 2015/0130576 | A1* | 5/2015 | Suzuki | H01F 41/005 336/92 |
| 2015/0279550 | A1* | 10/2015 | Kitami | H01F 27/30 336/178 |
| 2016/0189862 | A1* | 6/2016 | Miyauchi | H01F 41/005 29/606 |
| 2018/0190421 | A1* | 7/2018 | Yoshikawa | H01F 37/00 |

FOREIGN PATENT DOCUMENTS

| | | | |
|---|---|---|---|
| JP | 2010093138 A | | 4/2010 |
| JP | 2012028518 A | | 2/2012 |
| JP | 2013-149869 A | | 8/2013 |
| JP | 2013149869 A | * | 8/2013 |
| JP | 5459173 B2 | | 4/2014 |
| WO | 2014030359 A | | 2/2014 |

* cited by examiner

CORE AND COIL MOLDING STRUCTURE AND MANUFACTURING METHOD THEREOF

CROSS-REFERENCE TO RELATED APPLICATION

This application is based upon and claims the benefit of priority from Japan Patent Application No. 2016-163784, filed on Aug. 24, 2016, the entire contents of which are incorporated herein by reference.

FIELD OF THE INVENTION

The present disclosure relates to a structure having a core and a coil molded integrally, and a manufacturing method thereof.

BACKGROUND

Conventionally, in order to prevent a decrease in inductance, in-vehicle reactors having magnetic gaps with predetermined widths in between a plurality of core members are known. In this type of reactors, a spacer formed of, for example, ceramics, etc. is placed in the gap portion between each core members, adjacent core member and spacer are joined by an adhesive, and a plurality of core members are integrated to form a core used in the reactor.

As for the integrated cores, an annular core is known. In the annular core, U-shaped cores are disposed to face with each other at both ends, and an I-shaped core is disposed so as to be held between the U-shaped cores. Hence, a substantially annular closed magnetic path with the I-shaped core and the U-shaped cores being as magnetic paths is formed. A coil is wound around such core, and a reactor is formed.

Bobbins formed of resin are placed between the core and the coil in order to insulate the core from the coil, and the coil is molded with the bobbin that is a resin-molded component. In addition, a mold core which the entire core molded with a resin is known. Furthermore, a core and a coil integrally molded using a self-fusing coil having a self-fusing electric wire is proposed.

When a self-fusing coil is adopted to conventional reactors, the following disadvantages are pointed out. That is, with the self-fusing coil, it is difficult to completely eliminate the void between the coil layers. In particular, when vibrations are applied to the self-fusing coil, it becomes difficult to maintain fusion fastening of the coil, and a void is produced between the coil layers. Consequently, foreign materials may enter between the coil layers. In addition, in the case of the self-fusing coil, when the reactor is not housed in the casing and no filler is applied, or when the filling liquid surface is low in the case the reactor is housed in the casing, the coil may not be sufficiently fastened against vibration.

SUMMARY OF THE INVENTION

The present disclosure has been proposed in order to address the foregoing disadvantages, and an objective is to provide a core and coil molding structure and a manufacturing method thereof which are capable of eliminating a void between coil layers to prevent foreign materials from entering therein, and which improve the vibration resistance and shock resistance of a reactor.

To achieve the above objective, according to an aspect of the present disclosure, a core and coil molding structure includes:
 a core;
 a coil; and
 a resin member molding at least a part of the core and the coil, in which:
 a groove is formed in the resin member molded on an inner circumference of the coil; and
 a trace of a member which positions the coil at the time of molding of the resin member and which is present at the inner circumference of the coil forms the groove.

The groove may be formed in parallel with an axial direction of the coil. The core may be a core yoke component disposed so as to face an end portion of the coil. The groove may be tapered toward the core yoke component. The coil may be a rectangular coil, and at least one groove may be formed in each side of the inner circumference of the rectangular coil. The groove may have a semicircular cross-section. A thermal conductivity of the resin member may be equal to or higher than 0.5 W/m·k.

According to another aspect of the present disclosure, a method of manufacturing a core and coil molding structure includes:
 a core holding step of holding a core in a mold;
 a coil holding step of holding a coil in the mold; and
 a resin molding step of integrally molding the core and the coil held by the mold by filling a resin member to the mold,
 in which in the coil holding step, a holding member for the coil is inserted in an inner circumference of the coil to position the coil within the die.

In addition, a mold removing step, in which a removing direction of the mold is orthogonal to an axial direction of the coil, may be included.

According to the present disclosure, the groove is formed in the resin member at the inner circumference of the coil, and this groove is a trace formed by causing a positioning member for the coil at a molding stage to be present at the inner circumference of the coil, filling the resin member, and then pulling out the positioning member. That is, at the molding stage, the positioning member for the coil can hold the coil only from the inner circumference side of the coil. Hence, it becomes unnecessary to dispose a positioning member for the coil at the outer circumference of the coil, and the outer circumference portion of the coil can be surely covered by the resin member at the molding stage, preventing foreign materials from entering a space between coil layers. In addition, according to the present disclosure, since the outer circumference portion of the coil is surely covered by the resin member, the intimate contact between the coil and the resin member is improved, and even if a reactor does not utilize a filler or a reactor has a low filling liquid surface, excellent vibration resistance and shock resistance can be achieved.

DETAILED DESCRIPTION OF THE EMBODIMENTS

[1] Representative Embodiment

Figure 3:
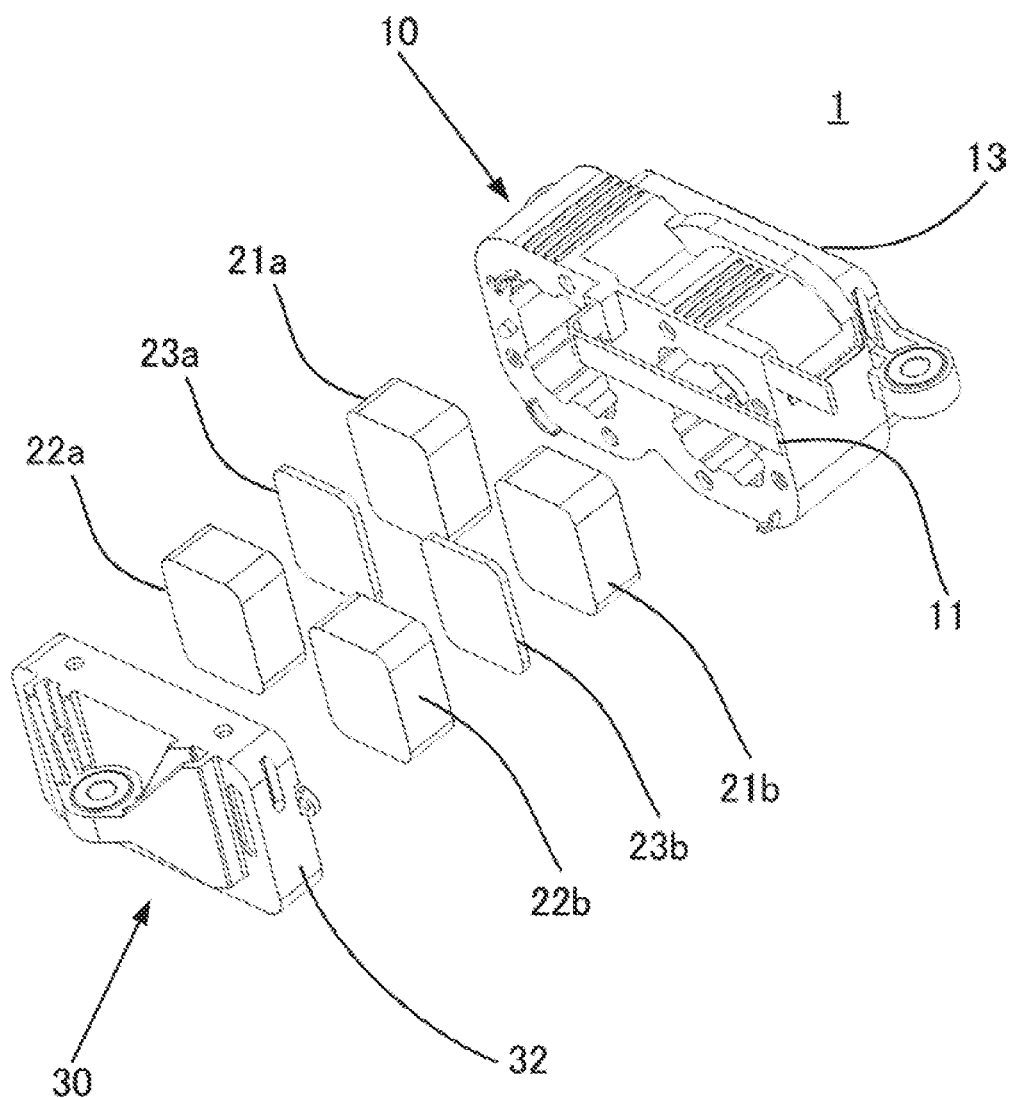
FIG. 3 is an exploded perspective view of the reactor according to the embodiment.
Figure 4:
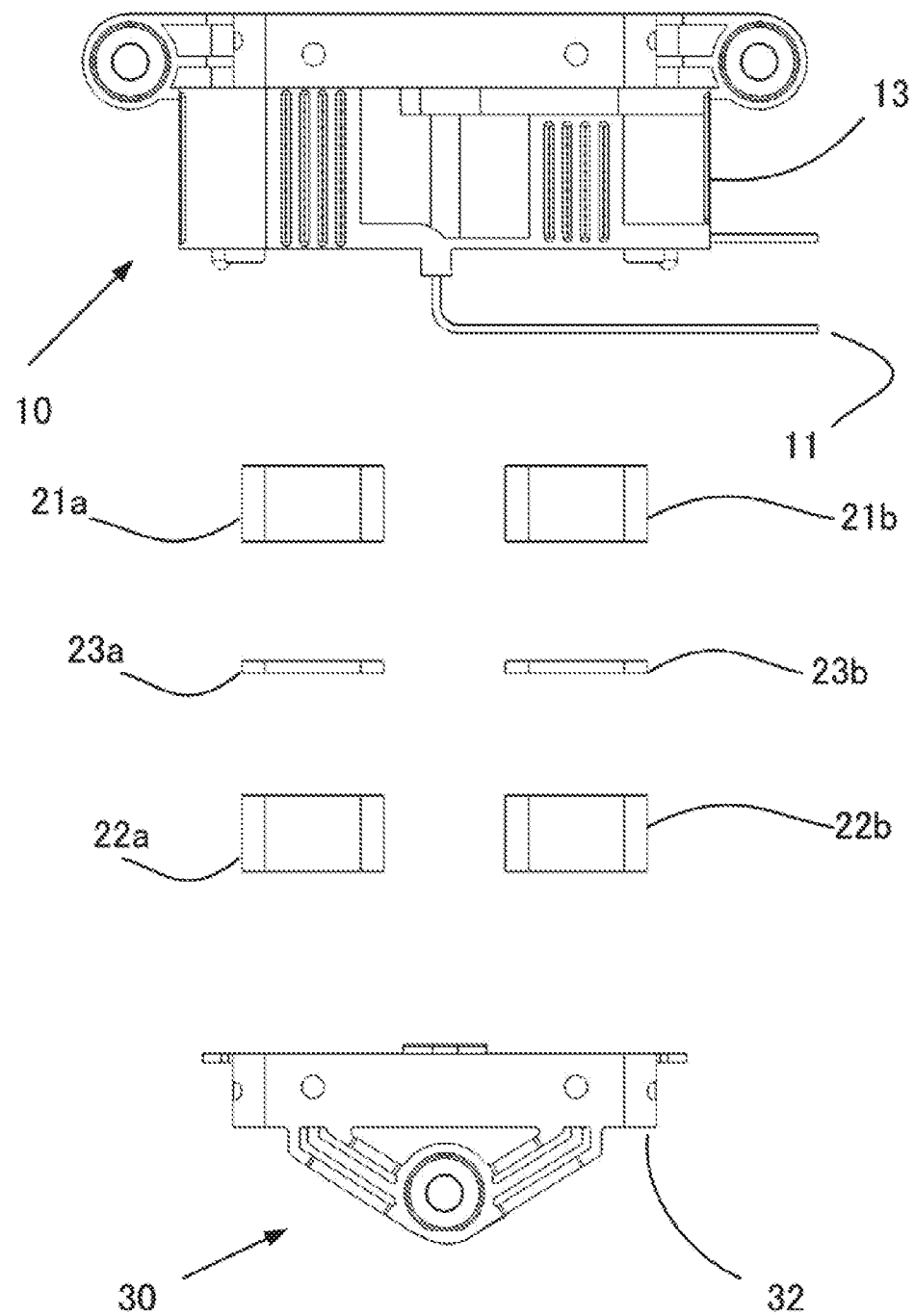
FIG. 4 is an exploded plan view of the reactor according to the embodiment.
Figure 5:
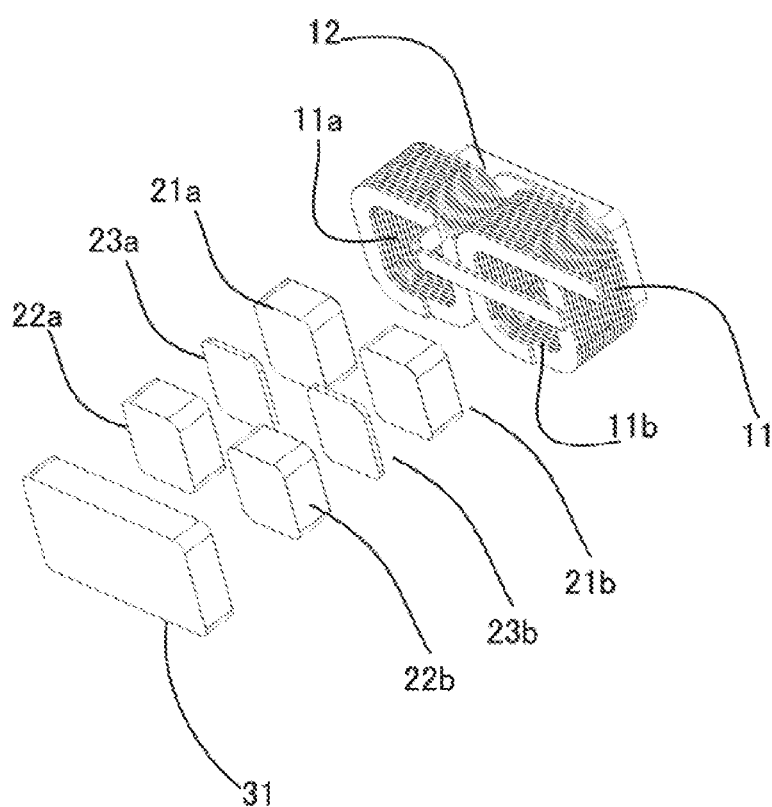
FIG. 5 is an exploded perspective view according to the embodiment with a resin being excluded.
Figure 6:
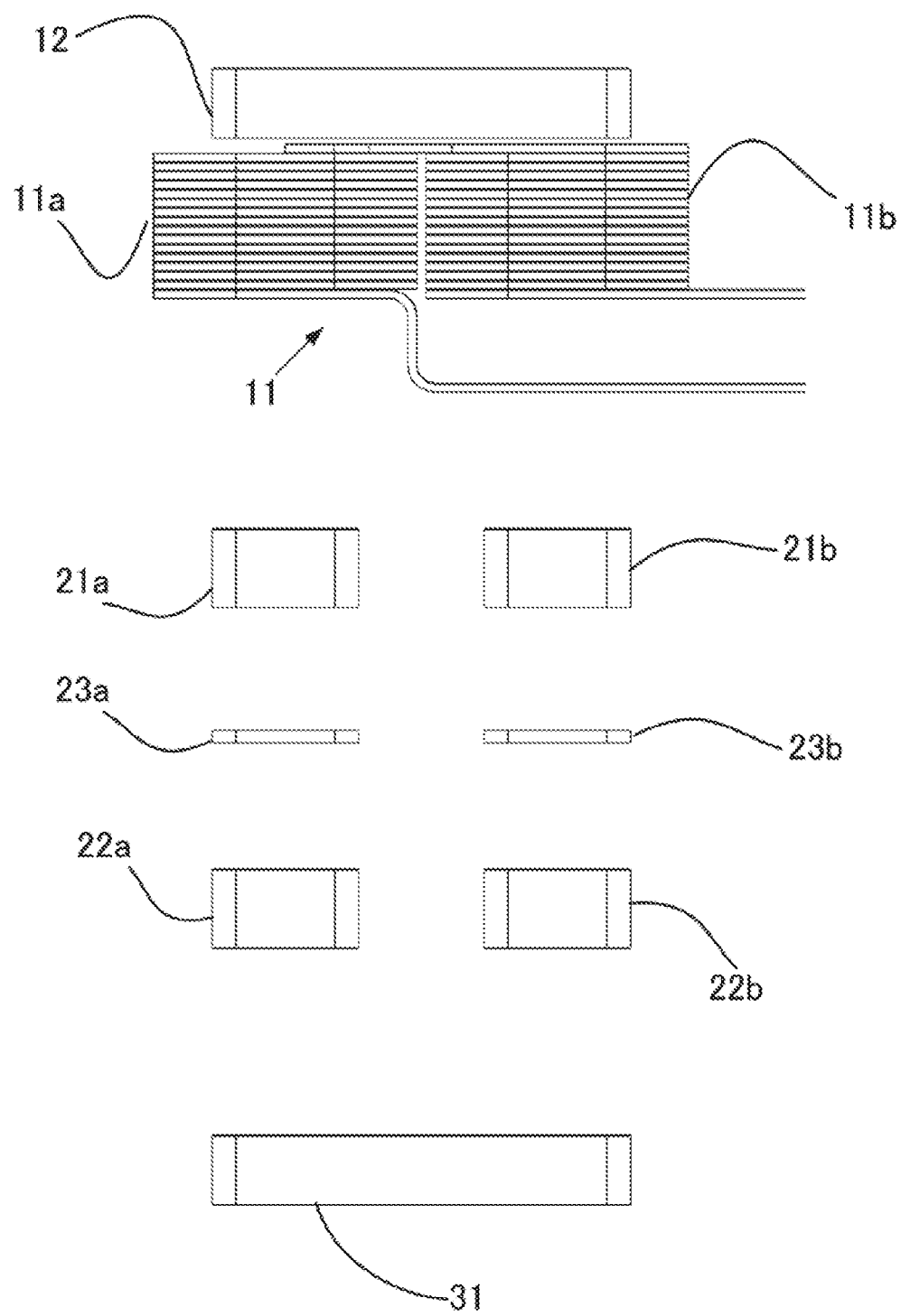
FIG. 6 is an exploded plan view according to the embodiment with a resin being excluded.
Figure 7:
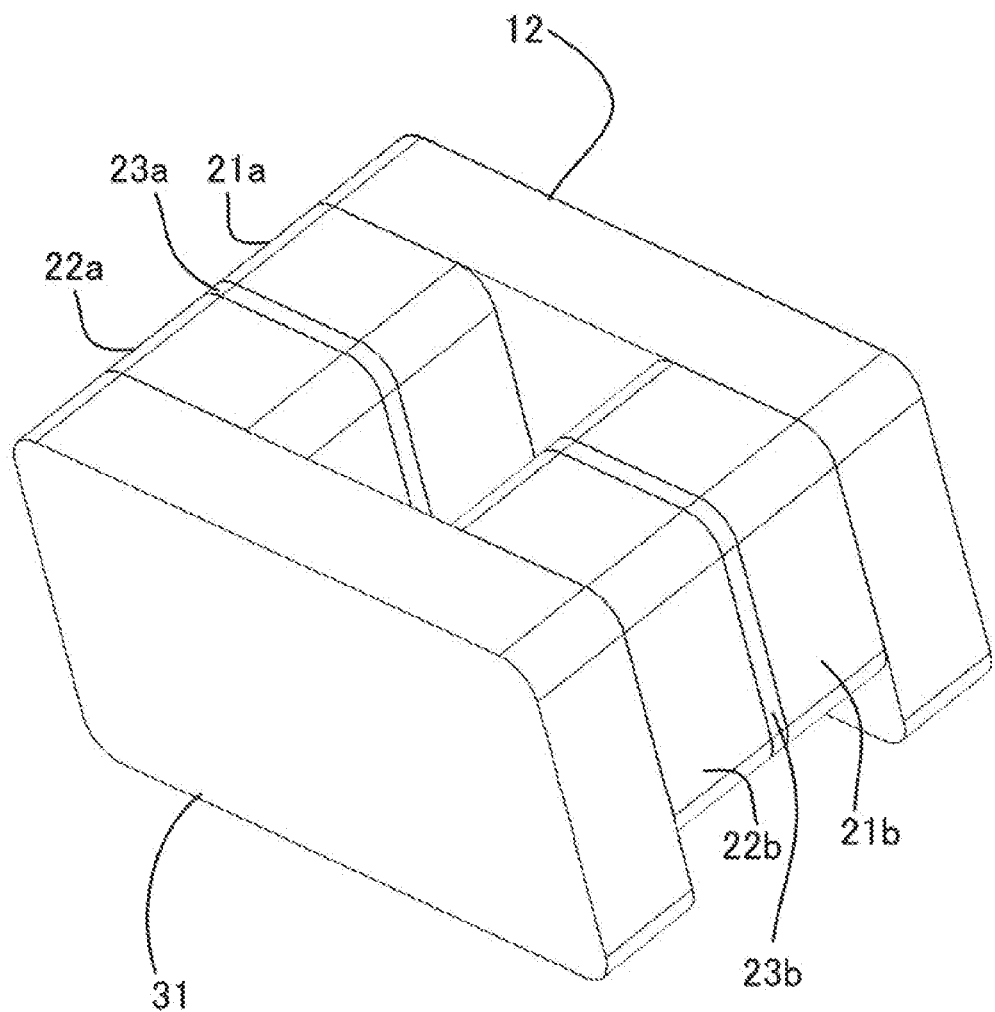
FIG. 7 is a perspective view of a core according to the embodiment.
Figure 8:
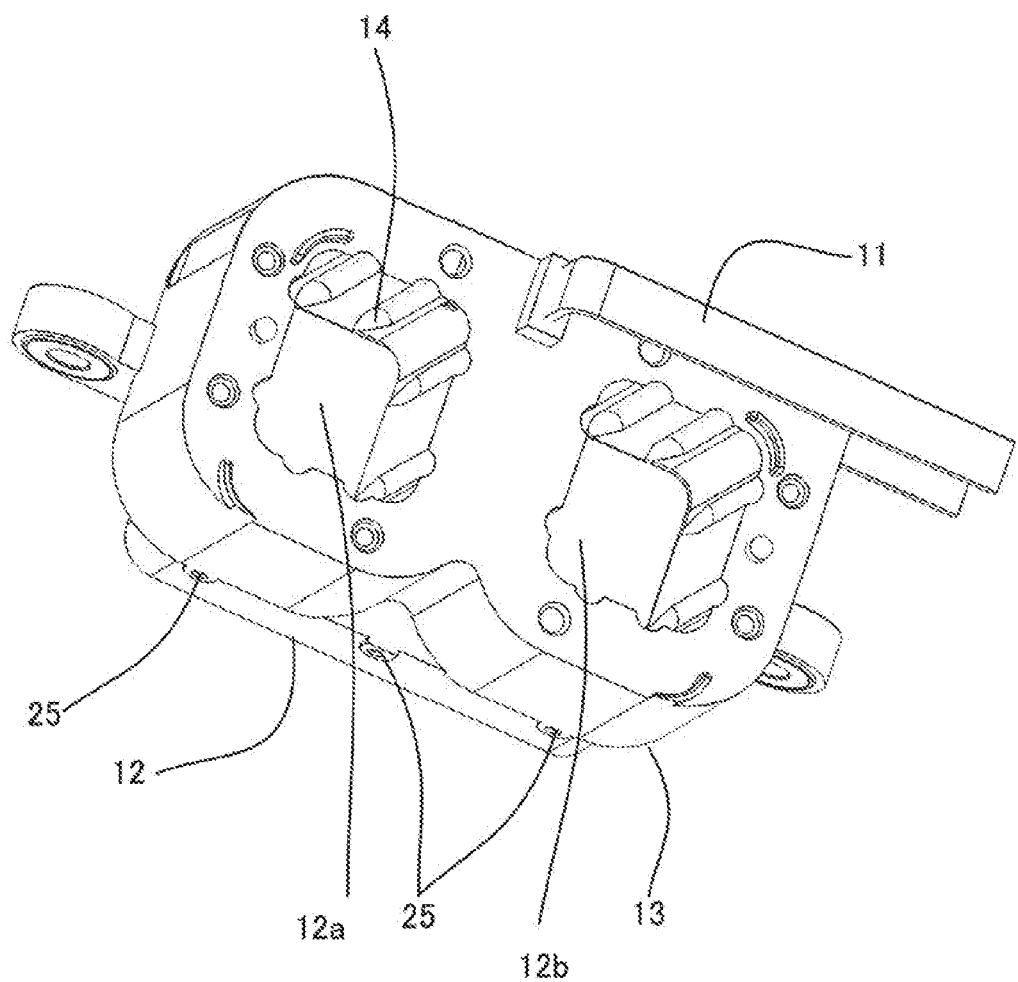
FIG. 8 is a perspective view according to the embodiment.
Figure 9:
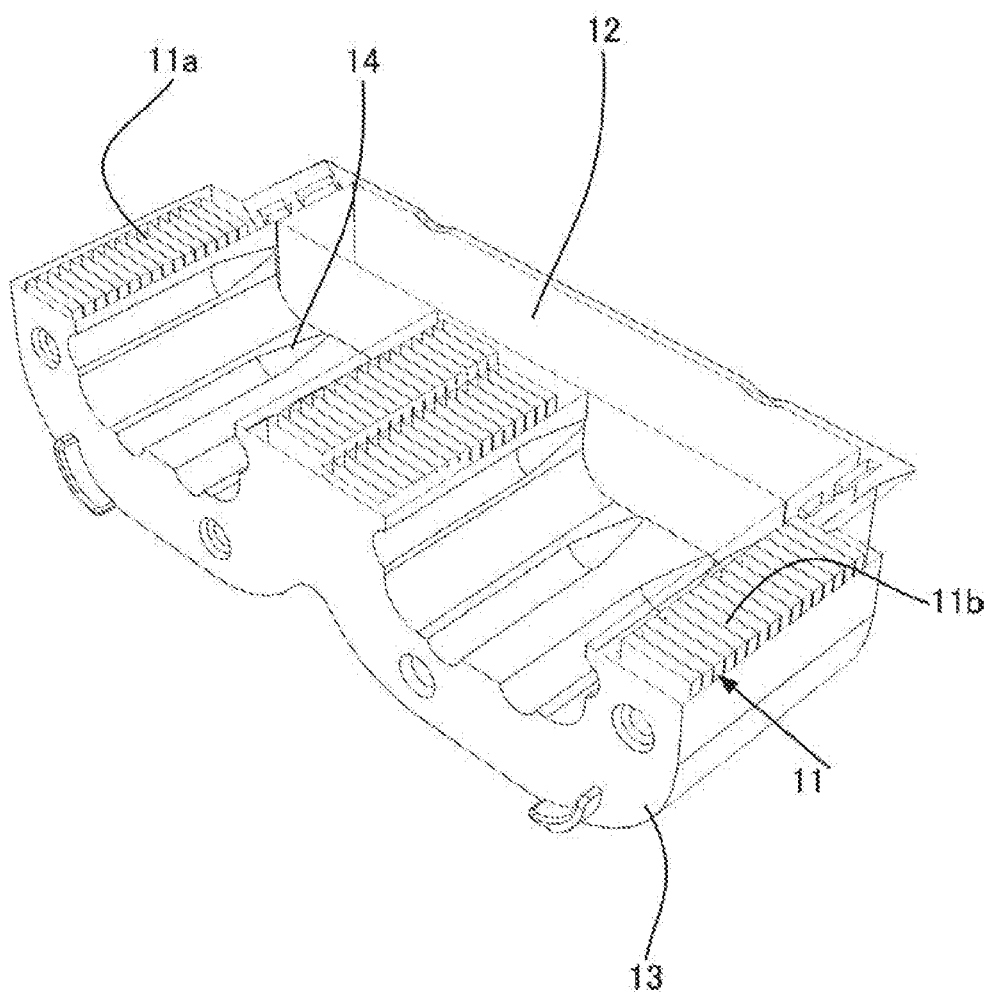
FIG. 9 is a horizontal cross-sectional perspective view according to the embodiment.
Figure 10:
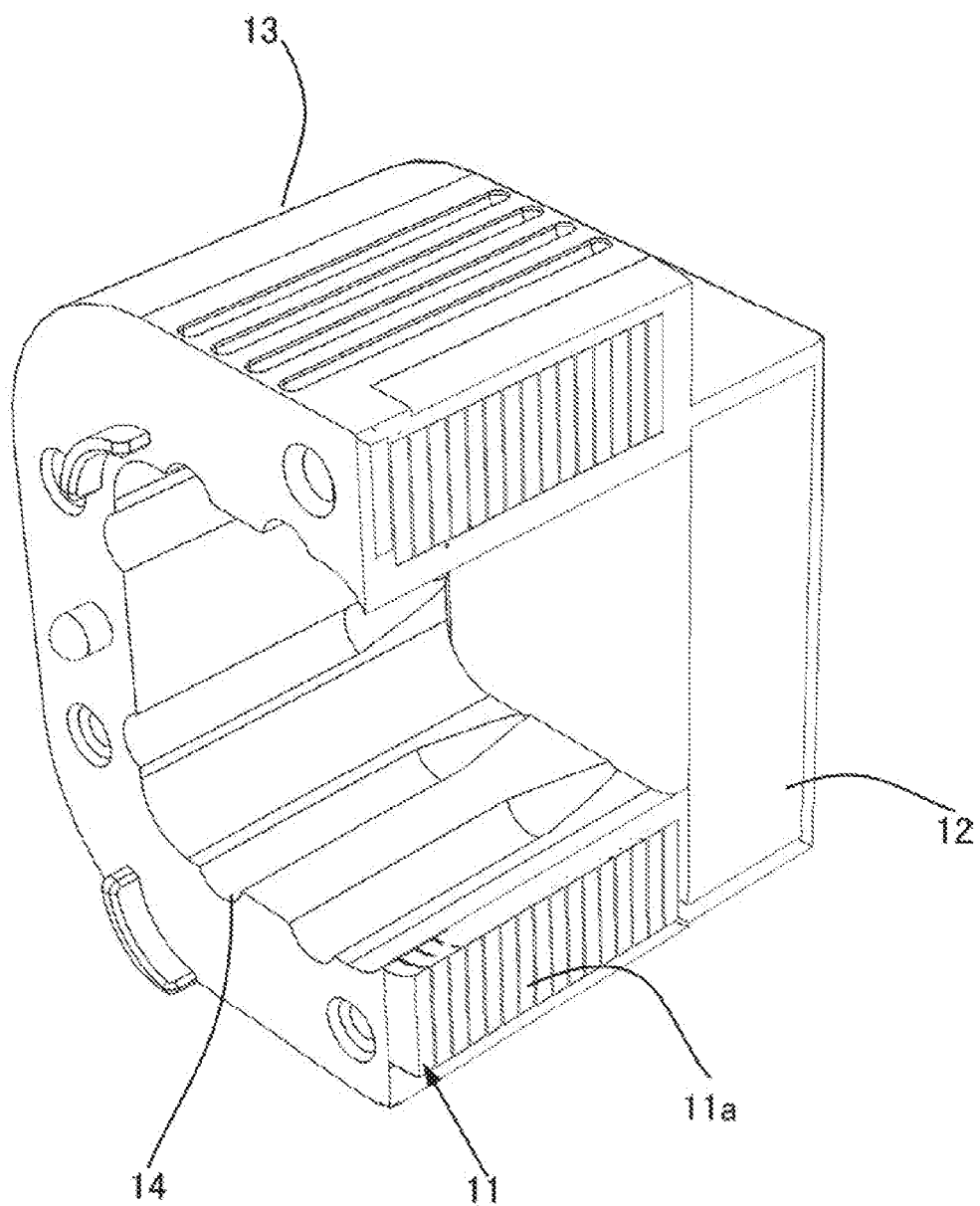
FIG. 10 is a vertical sectional perspective view according to the embodiment.
Figure 11:
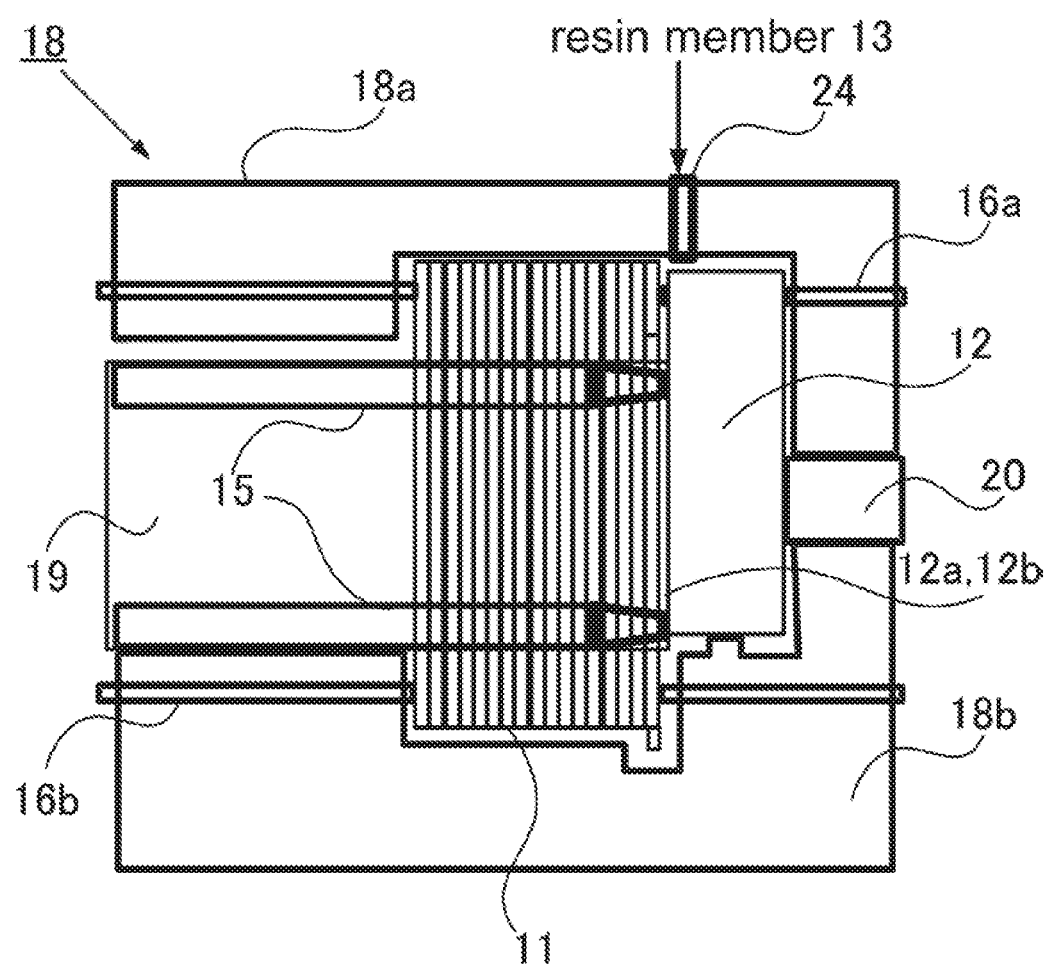
FIG. 11 is a side cross-sectional view for explaining a manufacturing method according to the embodiment.
Figure 12:
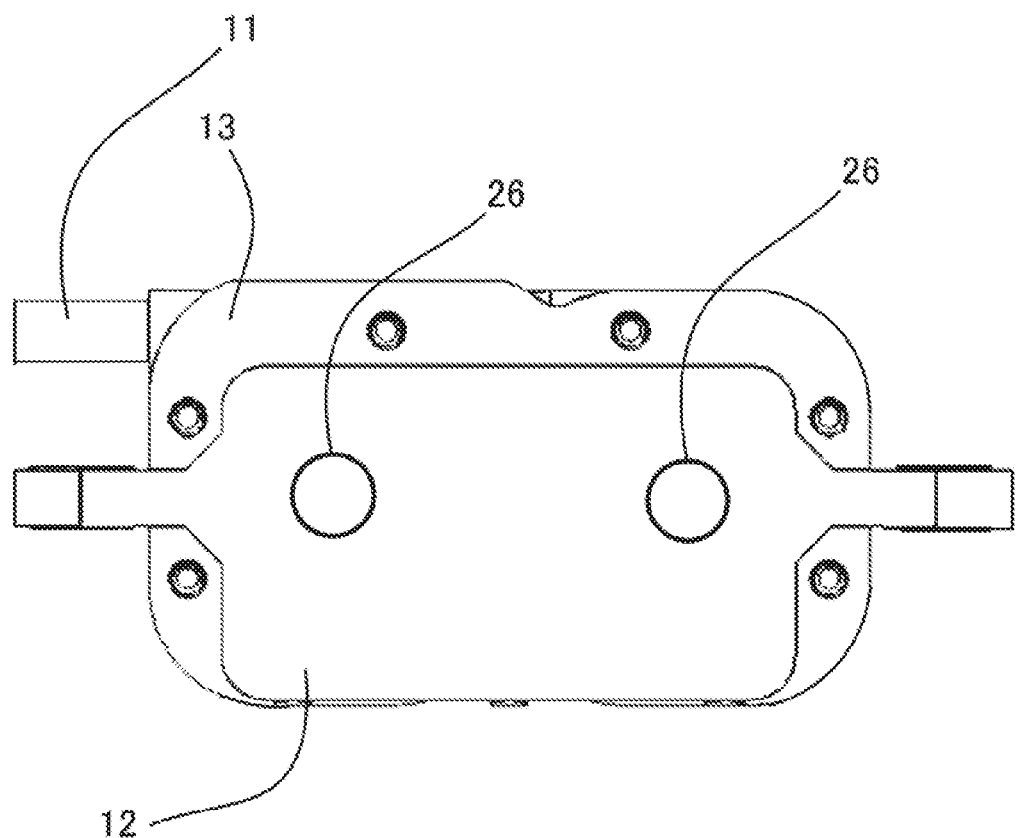
FIG. 12 is a front view according to the embodiment.
Figure 13:
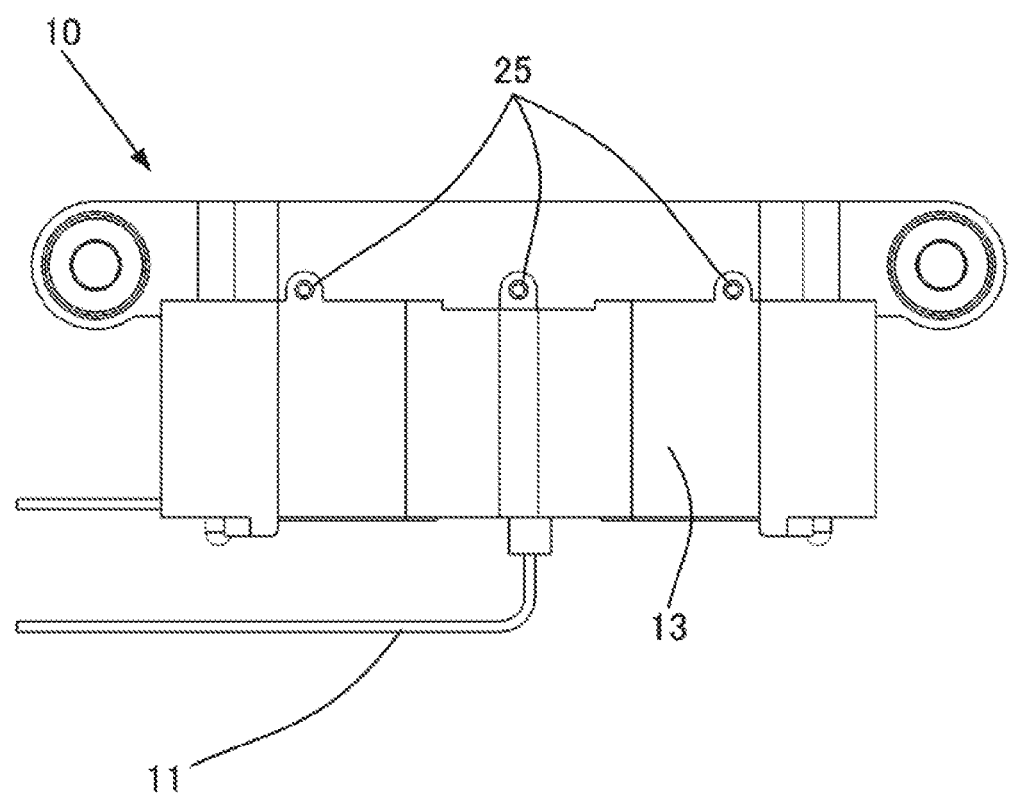
FIG. 13 is a bottom view according to the embodiment.

Hereinafter, with reference to FIGS. 1 to 13, a representative embodiment according to the present disclosure will be described. FIGS. 1 to 4 illustrate a reactor 1 incorporated with a core and coil molding structure according to this embodiment. FIGS. 5 and 6 illustrate internal components of the reactor 1 with a resin being excluded, and FIG. 7 illustrates a core component of the reactor 1, and FIGS. 8 to 10 illustrate a core-coil member 10 that is a member employing a core and coil molding structure. In addition, FIG. 11 is a view for explaining a manufacturing method of the core and coil molding structure according to this embodiment, and FIGS. 12 and 13 are a front view and a bottom view according to this embodiment.

(Structure)

As illustrated in FIGS. 1 to 4, the reactor 1 is a large-capacity reactor applied to, for example, a drive system for a hybrid vehicle or an electric vehicle. The reactor 1 includes the core-coil member 10 and a core member 30 adhered to each other. The core-coil member 10 is the member employing the core and coil molding structure according to the present disclosure.

The core-coil member 10 is a component that includes a coil 11 that is a rectangular coil and a core yoke component 12 in a block shape (illustrated in FIGS. 5 to 9) integrally molded by a resin member 13. The core yoke component 12 is a core member that connects leg portions of the core. As illustrated in FIGS. 8 to 10, grooves 14 are formed to the resin member 13 molded at the inner circumference of the coil 11 in parallel with the axial direction of the coil 11 and in. As illustrated in FIG. 11, the groove 14 is a trace of the positioning member 15 formed by pulling out the positioning member 15 of the coil 11, which positions the coil 11 in the mold and is present in the inner circumference of the coil 11 in the molding stage, after the resin member 13 is injected.

As illustrated in FIGS. 8 to 10, two grooves 14 are formed on each coil part on each side of the inner circumference of the coil 11 that is a rectangular coil. In addition, the groove 14 is formed to have a semicircular cross-section that is tapered toward the core yoke component 12 to have a conical shaped distal portion. The core member 30 is a member that has only a core yoke component 31 (illustrated in FIGS. 5, 6, and 8) in a block shape molded with a resin member 32 to the core-coil member 10.

The resin member 13 has the coil 11 and the core yoke member 12 integrally molded with each other with the end surface of the coil 11 facing the core yoke component 12. The resin member 13 is a member for an insulation between the coil 11 and the core yoke member 12, and example materials are an unsaturated polyester-based resin, a urethane resin, an epoxy resin, BMC (Bulk Molding Compound), PPS (PolyPhenylene Sulfide), and PBT (PolyButylene Terephthalate), etc. It is desirable that the thermal conductivity of the resin member 13 is equal to or higher than 0.5 W/m·k, and the higher the thermal conductivity, the more it is desirable.

As illustrated in FIG. 5 and FIG. 6, the coil 11 includes two coils 11a, 11b having windings wound and disposed in parallel with each other. The coil 11 is all molded by the resin member 13 (see FIGS. 1 to 4). That is, the inner circumferences and outer circumferences of the coils 11a and 11b are covered with the resin member 13.

The coils 11a and 11b are formed of windings employing the same structure, and respective one ends of the windings are coupled by a coupling line formed of the same material. In addition to this coupling scheme, several coupling schemes, such as welding, soldering, and cold welding of the right and left windings are applicable. The coils 11a and 11b are each formed of, for example, an edgewise coil which has a flat rectangular wire bent at right angle at four corners per a turn wound in a substantially square shape. As for the windings forming the coils 11a and 11b, various kinds of conductors are applicable, and for example, conductors wound in a substantially circular shape or a substantially elliptical shape are applicable.

As illustrated in FIG. 5 and FIG. 6, a block core 21a, a spacer 23 a, and a block core 22a are inserted at the coil 11a side in sequence. A block core 21b, a spacer 23b, and a block core 22b are inserted at the coil 11b side in sequence. The spacers 23a and 23b are held between the block cores 21a and 22a, and between 21b and 22b, and are nonmagnetic tabular member formed of various ceramics, such as alumina, or a resin. Note that the spacer may be eliminated, and for example, the spacer may be omitted by inserting the plurality of the block cores at the coil side.

As illustrated in FIGS. 5 to 7, the core yoke component 12 of the core-coil member 10 side and the core yoke component 31 of the core member 30 side are core members disposed in parallel with each other. The core yoke component 12 is a horizontally elongated core member in a block shape having a width dimension so as to cover the ends of the coils 11a and 11b of the coil 11. In addition, like the core yoke component 12, the core yoke component 31 is a horizontally elongated core member in a block shape.

The core yoke component 12 is disposed so as to face the end of the coil 11. Exposed surfaces 12a and 12b which are not covered with the resin member 13 and are capable of abutting the end surfaces of the block cores 21a and 21b are formed in portions of the core yoke component 12 which face the ends of the coils 11a and 11b (see FIG. 8). The end surface of the block core 21a abuts the exposed face 12a, while the end surface of the block core 21b abuts the exposed face 12b.

As illustrated in FIGS. 3 to 7, the block cores 21a, 22a and the block cores 21b, 22b are provided in parallel with each other as core legs connecting the core yoke components 12 and 31. Each of the block cores 21a, 22a, 21b, and 22b is a block-shaped core member having a chamfered portion chamfered at four corners and having a rectangular cross section.

These block cores 21a, 22a, 21b, and 22b, and the core yoke component 12 and the core yoke component 31 are integrated and joined by an adhesive, to form an annular core (see FIG. 7). That is, the core yoke components 12, 31 and the block cores 21a, 22a, 21b, and 22b are joined in a substantially annular shape to form a substantially annular closed magnetic path, and the reactor 1 is formed by winding the coil 11 around the block cores 21a, 22a, 21b, and 22b.

As for a material of the adhesive for joining the core members to each other, for example, it is preferable to apply an epoxy-based adhesive. In particular, when vehicular cooling oils, e.g., an ATF (Automatic Transmission Fluid) that is a lubricant for transmissions is applied as a refrigerant, an epoxy-based adhesive is preferable in view of the oil resistance performance. In addition, when other refrigerants are applied, for example, a silicone-based, acrylic-based, and polyurethane-based adhesive, or a mixed adhesive of two or more of those adhesives are applicable.

All of the above core members are magnetic powder moldings a dust core, and are produced by press molding magnetic powders. As for the material of the core member, metal powders, such as pure iron, silicon-iron alloy, and aluminum-silicon-iron alloy can be appropriately combined for a use. In addition, the core material is not limited to dust cores, and can also be applied to laminated steel sheets, amorphous and ferrite. By adjusting these materials and the gap dimension, the reactor 1 having various reactor characteristics can be obtained.

(Manufacturing Method)

According to the reactor 1 including the core-coil member 10 and the core member 30 as described above, the core-coil member 10 and the core member 30 are separately manufactured. The molding of the core-coil member 10 and the molding of the core member 30 may be performed simultaneously in the single mold, or may be performed at different timings using different molds.

The manufacturing method of the core-coil member 10 having the coil 11 and the core yoke component 12 in a block shape integrally molded by the resin member 13 includes (A) a coil holding step, (B) a core holding step, (C) a resin molding step, and (D) a mold removing step. The method of manufacturing the core-coil member 10 will be described with reference to FIG. 11.

In FIG. 11, reference numeral 18 indicates a mold. The mold 18 includes an upper mold 18a at the upper side, and a lower mold 18b at the lower side. For example, a gate 24 for filling the resin member 13 into the interior of the mold 18 is provided in the upper mold 18. As illustrated in FIG. 11, the mold 18 removes the upper mold 18a to the upper side, and the lower mold 18b to the lower side. That is, the removal direction of the mold 18 is a direction orthogonal to the axial direction of the coil 11. Note that the lower mold 18b supports the core yoke component 12 from the lower surface side.

(A) Coil Holding Step

Reference numerals 15, 16a and 16b are positioning members for the coil 11. As described above, the groove 14 is a trace of the positioning member 15 formed by the positioning member 15. Since the groove 14 has the shape of the positioning member 15 reflected, the positioning member 15 includes eight cylindrical pin-shaped members tapered toward the core yoke component 12.

The positioning member 15 is a member that positions the coil 11 in the mold 18. The positioning member 15, which is a pin shape, is inserted into the inner circumference of the coil 11 at the molding stage of the core-coil member 10. At this time, as the upper positioning member 15 goes over the inner circumference of the coil 11, the coil 11 is lifted up from the lower mold 18b, to have a predetermined clearance.

In addition, the positioned coil 11 has a predetermined clearance relative to the upper mold 18a.

The positioning members 16a and 16b are formed by pin-like members having a diameter smaller than that of the positioning member 15. The positioning members 16a and 16b position the coil 11 in the axial direction by holding the end surface of the coil 11 from the horizontal direction in FIG. 11. Since the positioning members 16a and 16b are in contact with the coil 11, as a result of removal of the positioning members 16a and 16b, an opening which the coil 11 is exposed or a recess at the resin member 13 side is formed.

(B) Core Holding Step

In the core holding step, the core yoke component 12 disposed so as to face the coil 11 is held in the mold 18. Reference numerals 19 and 20 illustrated in FIG. 11 are first and second slide members that position the core yoke member.

In those components, the first slide member 19 is a prism member having a distal end surface that can be inserted in the inner circumference of the coil 11. The first slide member 19 has a side surface abutting the entire inner circumference of the coil 11, and the distal end surface abutting the exposed surfaces 12a and 12b of the core yoke component 12 (see FIG. 11). Since the slide member 19 is abutting the surfaces corresponding to the exposed surfaces 12a and 12b, even if the resin molding step is performed, the resin member 13 does not flow into the abutting surface, and the exposed surfaces 12a and 12b are exposed from the resin member 13 (see FIG. 8).

The second slide member 20 is two columnar members held between the upper mold 18a and the lower mold 18b, and presses the back surface of the core yoke component 12. Openings 26 are formed at two locations on the back surface of the resin member 13 covering the core yoke component 12 as a result of the abutting by the second slide member 20 (see FIG. 12).

(C) Resin Molding Step

In the resin molding step, by filling the resin member 13 from the three gates 24 provided at the upper mold 18a side, the coil 11 and the core yoke component 12 held within the mold 18 are integrally molded by the resin member 13. Filling traces 25 of the resin member 13 from the gate 24 are formed at three locations on the resin member 13 covering the core yoke component 12 (see FIGS. 8 and 13). In addition, the core yoke component 12 is held at the lower mold 18b side by the self-weight of the core yoke component 12, the pressure in the horizontal direction by the first and second slide members 19 and 20, and the filling pressure of the resin member 13 filled from the gates 24.

(D) Mold Removing Step

The upper mold 18a, the lower mold 18b, the first and second slide members 19 and 20, and the positioning members 15, 16a and 16b for the coil 11 are removed in sequence to perform a mold removing step.

In the core-coil member 10 manufactured as described above, the block core 21a, the spacer 23a, and the block core 22a are inserted in sequence to the coil 11a molded by the resin member 13, and are joined by an adhesive, etc. In addition, the block core 21b, the spacer 23b, and the block core 22b are inserted in sequence to the coil 11b molded by the resin member 13, and joined by an adhesive, etc.

On the other hand, the core member 30 is likewise molded by setting the core yoke component 31 in the mold and filling the resin member 32 therein. The molding of the core-coil member 10 and the molding of the core member 30 may be performed simultaneously in the single mold or different timings using different molds.

Figure 1:
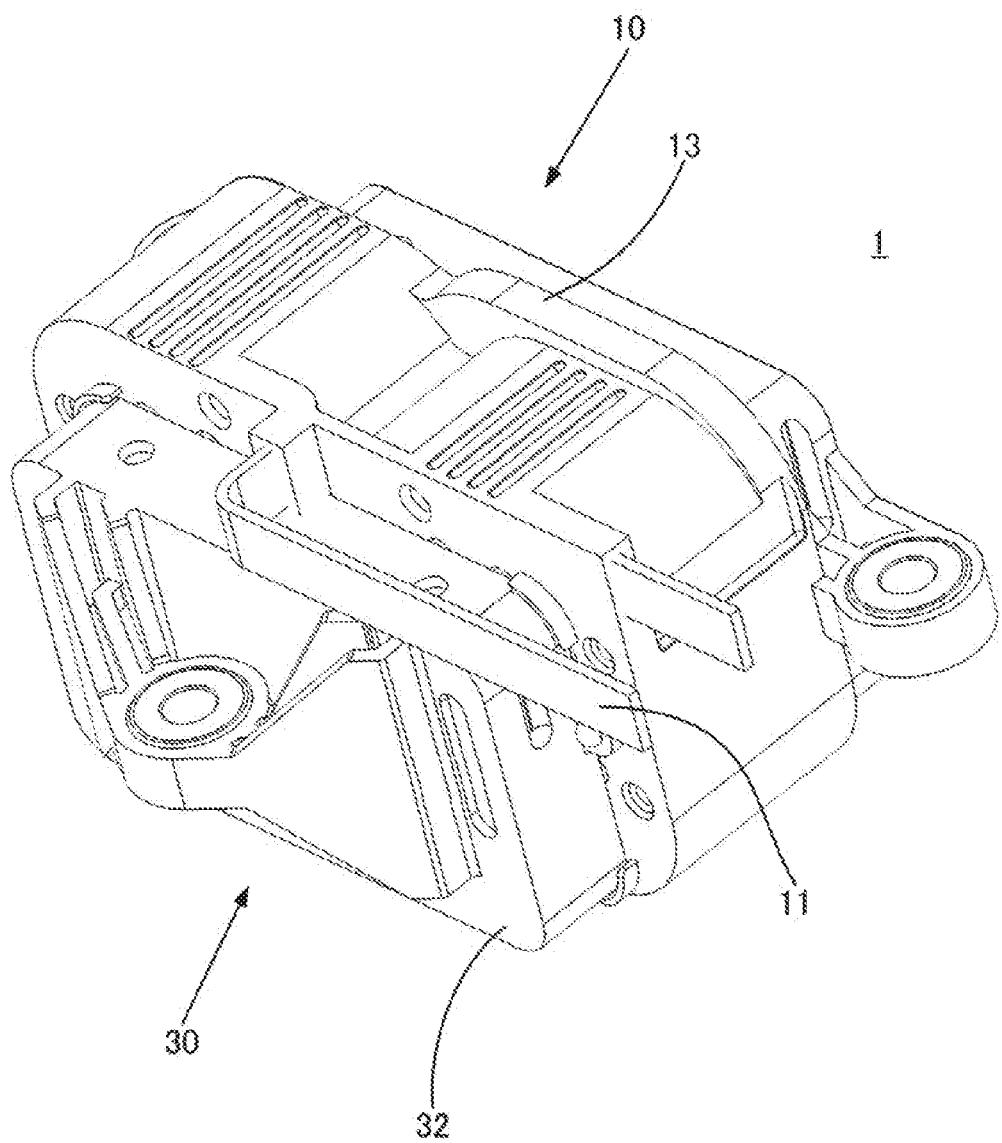
FIG. 1 is a perspective view of a reactor according to an embodiment.
Figure 2:
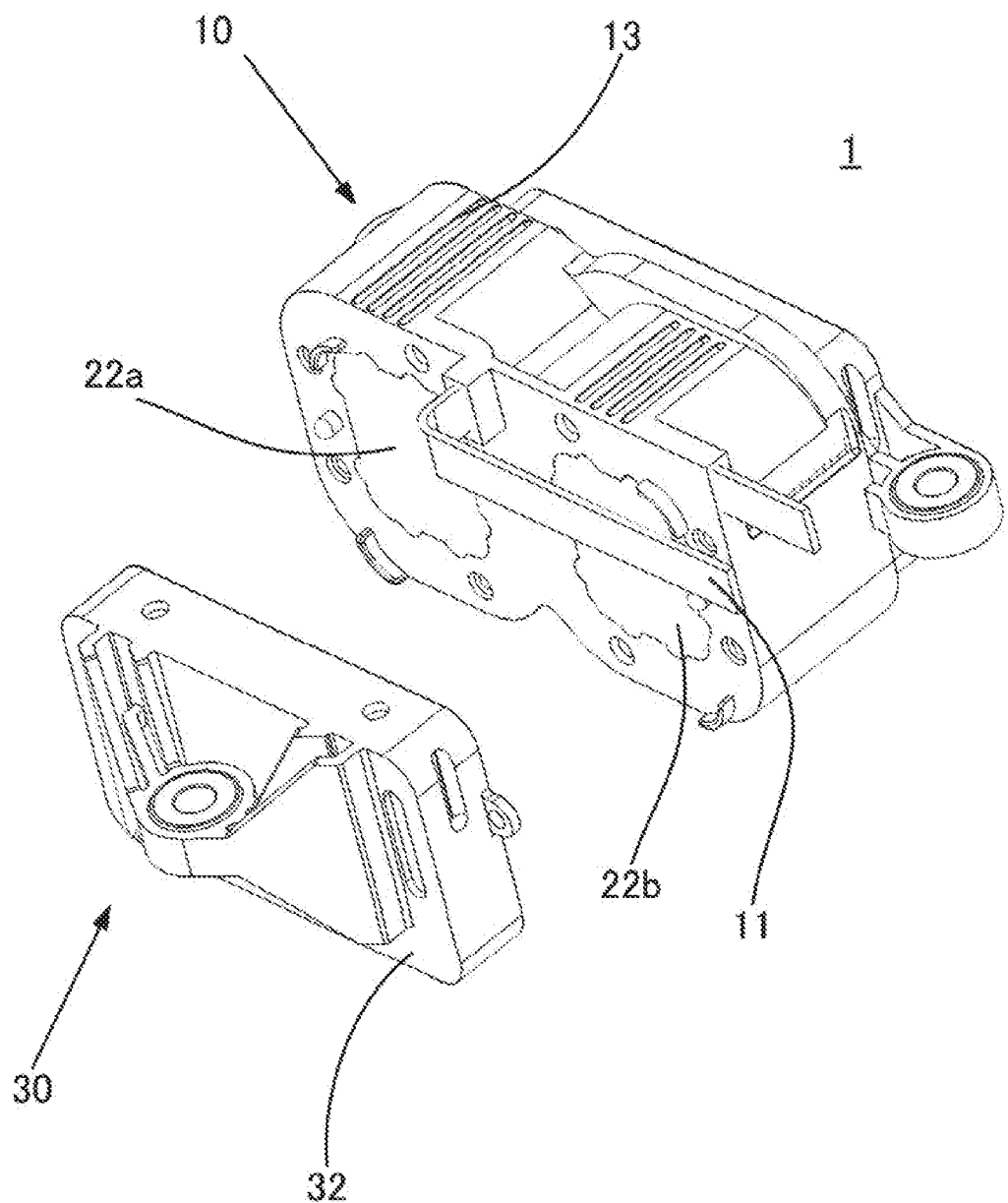
FIG. 2 is an exploded perspective view of the reactor according to the embodiment.

The reactor 1 is assembled by joining the core-coil member 10 (the component having the block cores, etc., bonded thereto) and the core member 30 manufactured as described above by an adhesive. At this time, as illustrated in FIGS. 2 to 4, etc., the core yoke component 31 of the core member 30 is joined to the block cores 22a and 22b housed in the core-coil member 10, and the core-coil member 10 and the core member 30 are integrated to provide the reactor 1.

(Actions and Effects)

The actions and effects according to this embodiment are as follows.

(1) In this embodiment, the grooves 14 are formed in the resin member 13 covering the inner circumference of the coil 11. The grooves 14 are formed by pulling out the positioning member 15 which positions the coil 11 at the molding stage, and which is present at the inner circumference of the coil 11. That is, at the molding stage of the core-coil member 10, the positioning member 15 holds the coil 11 from the inner circumference side.

Therefore, it is unnecessary to install any member for positioning the coil 11 at the outer circumference side of the coil 11. Hence, during the resin molding step, the outer circumference of the coil 11 can be surely covered by the resin member 13. Consequently, foreign matters can be prevented from entering the space between the layers of the coil 11, and the layer-short-circuit of the coil 11 can be prevented. In addition, fretting of the coil 11 can also be prevented. As a result, it is possible to further improve the product reliability.

(2) The coil 11 and the core yoke portion 12 are disposed so as to face each other, and then molded integrally by the resin member 13. At this time, the coil 11 is floated in the mold 18 and held by the positioning members 15, 16a, and 16b, and the core yoke component 12 is held in the mold 18 by the first and second slide members 19 and 20 for positioning the core yoke component. Hence, it is possible to highly precisely hold the coil 11 and the core yoke portion 12 independently at the desired position in the mold 18.

According to this embodiment as described above, the assembling efficiency of the reactor 1 can be improved. In addition, since the integral molding of the coil 11 and the core yoke component 12 is easily achieved by the resin member 13, it is possible to secure the sufficient distance between the coil 11 and the core yoke component 12, suppressing the occurrence of partial discharge, enabling a manufacture of highly reliable products.

(3) In this embodiment, it is possible to integrally mold the coil 11 and the core yoke member 12 by the resin member 13. Hence, in the reactor 1, even if no filler is applied or when the filling liquid surface is low, the coil 11 can be firmly fastened. Consequently, the vibration resistance and shock resistance of the coil 11 are improved, and the operation reliability of the reactor 1 can be improved.

(4) As illustrated in FIG. 11, in the resin molding step of this embodiment, by applying loads by the abutting slide members 19, 20 with the core yoke part 12 in the horizontal direction in FIG. 11, the slide members 19 and 20 and the core yoke component 12 are intimately in contact with each other at the abutting part. Hence, at the time of integral molding, the resin member 13 does not flow into the intimate contact surfaces between the slide members 19, 20 and the core yoke component 12, and the exposed surfaces 12a, 12b are formed. In other words, the exposed surfaces 12a and 12b are formed because the resin member 13 is not formed.

Hence, the resin member 13 does not flow into the joining surfaces of the block cores 21a, 21b, the spacers 23a, 23b, and the block cores 22a, 22b. Accordingly, the block cores 21a, 21b, the spacers 23a, 23b, and the block cores 22a, 22b can be securely joined by an adhesive, etc.

(5) In this embodiment, the exposed surfaces 12a and 12b that can abut the end surfaces of the block cores 21a and 21b are formed at the surface portion of the core yoke component 12, and an annular core having the block cores 21a, 22a, 21b, 22b and the core yokes component 12 and the core yoke component 31 integrated can be easily manufactured.

(6) In this embodiment, by forming the grooves 14 along the axial direction of the coil 11 at the inner circumference of the coil 11, the area of the outer circumferences of the block cores 21a, 22a, 21b, 22b abutting the inner circumference surface of the coil 11 are reduced, and the friction between those components can be reduced. This enables a smooth insertion of the block cores 21a, 22a, 21b and 22b into the inner circumference of the coil 11, and the assembling easiness is further improved.

(7) In addition, when the block cores 21a, 21b, the spacers 23a, 23b, and the block cores 22a, 22b are inserted into the inner circumference of the coils 11a, 11b, the outer circumferences of the block core and spacer do not directly contact the recessed portions of the grooves 14. Hence, even if the recessed portion of the groove 14 is not covered by the resin member 13 due to the presence of the positioning member 15 of the coil 11, the outer circumference of the core member inserted into the inner circumference of the coil 11 does not directly contact the coil 11, and the insulation performance does not deteriorate.

(8) In this embodiment, a total of eight grooves 14 are provided in a manner of two grooves provided on each side of the inner circumference of the coil 11. This means that the coil 11 is supported by the eight positioning members 15 of the coil 11 at the time of molding. By holding the coil 11 by such large number of positioning members 15, the supportability of the coil 11 is increased.

In addition, since the coil 11 that is a rectangular coil is wound by placing a jig at the inner diameter side, the dimensional stability of the coil at the inner diameter side is high, and the positioning precision when supporting the coil 11 is quite high. Therefore, the positioning precision of the coil 11 supported by the positioning member 15 is extremely high, and the assembling efficiency of the reactor 1 can be further enhanced.

(9) The positioning member 15 for the coil 11 that is a pin shape is tapered toward the core yoke component 12. Hence, the positioning member 15 has the high insertability relative to the coil 11. In addition, since the positioning member 15 can be smoothly inserted into the inner circumference of the coil 11, the inner circumference of the coil 11 surely goes over the positioning member 15. Accordingly, the covering film of the coil 11 is not likely to be damaged. Still further, since the positioning member 15 in a cylindrical shape has a semicircular cross-section and has no corner, the positioning member 15 is less likely to damage the covering film of the coil 11, also in this point.

(10) Since the thermal conductivity of the resin member 13 is equal to or greater than 0.5 W/m·k, the heat dissipation performance of the coil 11 is improved.

(11) In this embodiment, since the removing direction of the mold 18 is orthogonal to the axial direction of the coil 11, the outer circumference of the coil 11 can be held to float within the mold 18, and the outer circumference of the coil 11 can surely be covered by the resin member 13. In addition, by placing the end surface of the fastening member (collar) and the dividing surface of the mold 18 in parallel with each other, there is an effect that the molding of the fastening member (collar) can be performed simultaneously.

(12) Since the ends of the coils 11a and 11b are connected to each other by a connecting line, an additional connection is unnecessary, stabilizing the shape and dimension of the connected portion. This facilitates the resin member 13 to be molded uniformly relative to the coil 11, and the core 11 is easily formed integrally with the resin member 13.

(13) In this embodiment, in the resin molding step, the core yoke component 12 is held at the lower mold 18b side by the self-weight of the core yoke component 12, the pressure from the first and second slide members 19 and 20 in the horizontal direction, and the filling pressure of the resin member 13. That is, since it is pressed toward the lower mold 18b side by the filling pressure of the resin member 13, there is no need to press the coil 11 and the core yoke component 12 by an abutting mold, etc., from the upper side.

Hence, even when the filling trace 25 of the resin member 13 is remains at the gate 24 side, an opening that exposes the coil 11 and the core yoke component 12 is not formed. In this case, the side with no opening is the installation target surface of the reactor 1. Hence, exposing locations of the coil 11 and the core yoke component 12 are not formed at the installation surface side for the reactor. Consequently, there is an advantage such that insulation relative to the installation surface is facilitated.

[2] Other Embodiments

The present disclosure is not limited to the foregoing embodiment, and is not limited directly to the embodiment, but can be achieved with a modification to the structural component without departing from the scope of the present disclosure. In addition, various types of the present disclosure are achieved by an appropriate combination of the several structural components disclosed in the foregoing embodiment. Several structural components may be eliminated from all the structural components disclosed in the embodiment. In addition, structural components of different embodiments may be combined as appropriate. More specifically, the present disclosure covers the following other embodiments.

Figure 14:
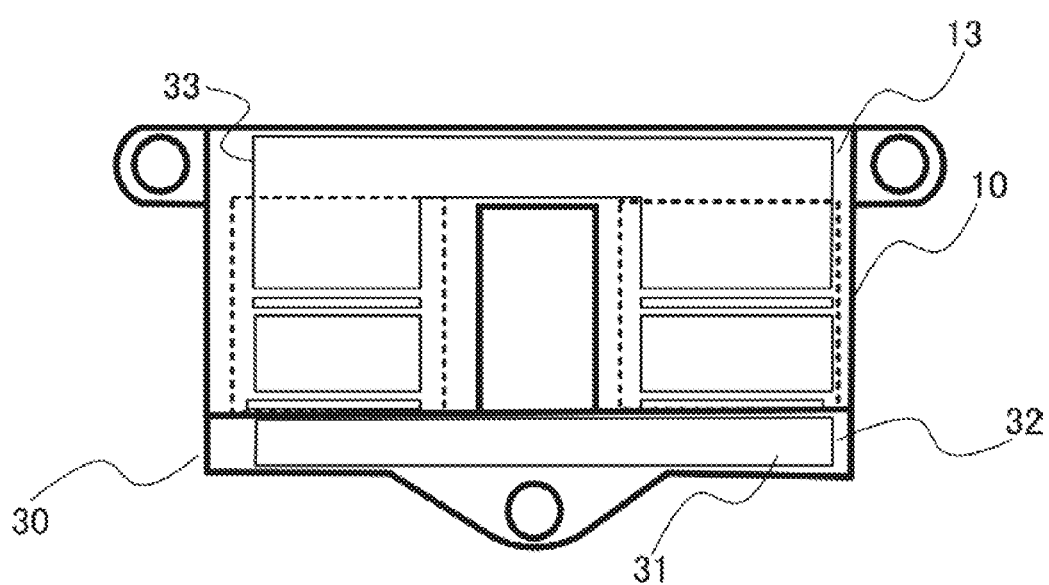
FIG. 14 is a plan view according to another embodiment.

(1) As for the core member applied to the core-coil member 10 and the core member 30, the present disclosure is not limited to only the core yoke component 12 but the shape, dimension and quantity, and further material of the core, and the manufacturing method thereof can be selected as appropriate. For example, as for a core to be integrally molded with the coil 11, a U-shaped core 33 as illustrated in FIG. 14, and further an I-shaped core, etc., may be adopted. In this case, the above effects can be obtained in the U-shaped core 33 or the I-shaped core. In addition, an I-shaped core or a gap may not be held between the U-shaped cores to be the annular core.

(2) As for the coil, the shape and the structure can also be selected freely. For example, as for the shape of the coil, coils may be wound around each of the right and left leg portions of the θ-shaped core, or the coil may be wound around the yoke portion of the θ-shaped core. When a circular or angular loop-shape core is adopted, coils may be wound around each of the right and left leg portions, or a coil may be wound around only one of the two leg portions. The coil 11 may be other than a rectangular coil, and may be, for example, a cylindrical coil. In this case, the groove formed in the cylindrical coil can be selected as appropriate as long as the coil positioning member can fasten the coil.

More specifically, the positioning members may be evenly disposed at four positions of the coil by shifting the position by 90 degrees, and the four grooves may be evenly disposed. When the groove is disposed one by one at the coil portion of each side of the rectangular coil inner diameter, the groove may be disposed one by one at the center portion of the coil portion at each side, or the groove may be disposed at each corner portion of the rectangular coil. In addition, the coil may be other than a coupling coil.

(3) In the above-described embodiment, the number of the grooves is eight, that is, the number of positioning members for the coil is eight. However, as long as at least two pairs of positioning members facing with each other, that is, a total of four positioning members are provided, at least the position of the coil is decided, which is suitable. In addition, the position and number of the grooves can be changed as appropriate, and the grooves may be collectively formed at the upper portion of the inner circumference instead of at the center of the inner circumference, or may be collectively formed at the corner portion. As for the shape of the groove, the distal end does not have to be tapered, and for example, a circular cylindrical shape or a rectangular columnar shape having a uniform cross-sectional area to the tip, may be adopted.

(4) When the block cores 22a, 22b, etc., are housed in the core-coil member 10 side, a gap surface may be provided in advance on the end surface at the core-coil member 10 side. Alternatively, when the core yoke component 31 is molded at the core member 30 side, a gap surface may be provided in advance on the end surface on the core member 30 side.

According to these embodiments, by simply joining the core-coil member 10 and the core member 30, a gap portion as a space can be securely provided between the block cores 22a and 22b housed at the core-coil member 10 side, and the core yoke component 31 at the core member 30 side. In this case, there is an advantage that a gap portion can be formed without applying a spacer. In particular, since the core-coil member 10 and the core member 30 can be precisely produced by a mold, the dimensional precision of the gap portion increases, and a spacer for ensuring the dimension becomes unnecessary.

What is claimed is:

1. A core and coil molding structure comprising:
   a core comprising at least one parallelepiped core yoke component and at least one block core;
   a coil, wherein the at least one block core is at least partially received within the coil; and
   a resin member molding at least a part of the core and the coil,
   wherein a groove is formed in the resin member molded on an inner circumference of the coil, and wherein the at least one parallelepiped core yoke component is disposed adjacent to an end portion of the coil, the groove extending parallel with an axial direction of the coil, and wherein a distal portion of the groove is tapered towards the at least one parallelepiped core yoke component, the groove having a semicircular cross-section wherein the distal portion has a conical shape.

2. The core and coil molding structure according to claim 1, wherein:
   the coil is a rectangular coil; and
   at least the one groove is formed in each side of the inner circumference of the rectangular coil.

3. The core and coil molding structure according to claim 1, wherein a thermal conductivity of the resin member is equal to or higher than 0.5 W/m·k.

4. The core and coil molding structure according to claim 1, wherein the groove is formed by a shape or configuration of a pin shaped member which is positioned on the inner circumference of the coil at a time of molding.

\* \* \* \* \*